United States Patent [19]

Duvdevani et al.

[11] Patent Number: 4,621,111

[45] Date of Patent: Nov. 4, 1986

[54] ACID BASE INTERACTING POLYMER SOLUTIONS

[75] Inventors: Ilan Duvdevani, Leonia; Donald N. Schulz, Annandale, both of N.J.; Kissho Kitano, Ohi, Japan; Dennis G. Peiffer, E. Brunswick, N.J.

[73] Assignee: Exxon Research and Engineering Company, Florham Park, N.J.

[21] Appl. No.: 803,244

[22] Filed: Dec. 2, 1985

Related U.S. Application Data

[63] Continuation-in-part of Ser. No. 626,021, Jun. 29, 1984, abandoned, which is a continuation-in-part of Ser. No. 566,349, Dec. 28, 1983, abandoned.

[51] Int. Cl.$^4$ .......................... C10L 7/00; C08K 5/51
[52] U.S. Cl. .................................... 524/107; 524/136; 524/210; 524/300; 524/356; 524/366; 524/379; 44/7.7
[58] Field of Search ................ 526/317, 158; 525/301; 44/7.1–7.7; 585/10, 12, 14; 524/107, 136, 210, 300, 356, 366, 374

[56] References Cited

U.S. PATENT DOCUMENTS

| | | | |
|---|---|---|---|
| 3,539,603 | 11/1970 | Clough | 260/407 |
| 3,658,491 | 4/1972 | Canterino | 44/7.5 |
| 3,755,279 | 8/1973 | Langer et al. | 526/158 |
| 4,002,436 | 1/1977 | Osmond | 585/10 |

Primary Examiner—Theodore Morris
Attorney, Agent, or Firm—Richard E. Nanfeldt

[57] ABSTRACT

A process for increasing the viscosity of a hydrocarbon liquid having a viscosity of at least about 10 cP which includes the steps of:
(a) forming a first solution of an organic hydrocarbon liquid and a hydrolyzed Ziegler-Natta ester containing copolymer of an alpha-olefin and a vinyl alkylenecarboxylic acid having an acid content of from about 0.01 to 10 mole percent and a molecular weight of about 100,000 to about 10,000,000, wherein said copolymer of said alpha-olefin and said vinyl alkylenecarboxylic acid has the formula:

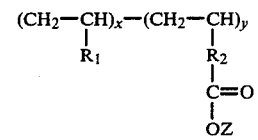

wherein Z is a mixture of H and an alkyl group having about 1 to about 25 carbon atoms, wherein H comprises about 55 to about 99 mole % of Z, $R_1$ is an alkyl group having about 1 to about 25 carbon atoms, $R_2$ is an alkylene group having about 1 to about 17 carbon atoms, x is about 99.99 to about 95.0 mole %, more preferably about 99.95 to about 97.0 and most preferably about 99.90 to about 98.0, and
(b) forming a second solution of an organic hydrocarbon liquid and an amine containing polymer which contains basic nitrogen atoms wherein the basic nitrogen content ranges from about 4 to about 500 milliequivalents per 100 gms. of polymer;
(c) mixing said first and said second solutions to form a hydrocarbon solution liquid having an interpolymer complex of said neutralized copolymer of an alpha-olefin and a vinyl alkylenecarboxylic acid and said amine containing polymer therein, wherein said complex is present at a level of from 0.01% to about 10%; and
(d) subjecting said hydrocarbon solution of said interpolymer complex to an increasing shear rate thereby causing the viscosity of said hydrocarbon solution of said interpolymer complex to increase.

15 Claims, No Drawings

ACID BASE INTERACTING POLYMER SOLUTIONS

This application is a continuation-in-part of U.S. Ser. No. 626,021, filed June 29, 1984, which in turn is a continuation-in-part of U.S. Ser. No. 566,349, filed Dec. 28, 1983, both now abandoned.

FIELD OF THE INVENTION

The present invention relates to a process for the viscosification of an organic liquid which comprises the steps of forming a first solution of a polymer containing carboxylic acid groups in the organic liquid; forming a second solution of a polymer containing a base in the organic liquid; and mixing the first and the second solutions together to form an interpolymer complex of the acid containing and base containing polymers in the organic liquid, wherein the organic liquid containing the interpolymer complex has improved viscosification properties. This solution possesses higher viscosity than the mean of the separate viscositites of the starting solutions at relatively low solids content. Moreover, these interpolymer complexes, in hydrocarbon solutions, can be formulated to exhibit shear thickening rheology at increased shear rates, which is useful for antimisting properties of the solution. Furthermore, the present invention also discloses a process wherein viscosification and shear thickening can be reduced.

DESCRIPTION OF PRIOR ART

In recent years, interpolymer complexes have received considerable attention in the literature due to their intresting and unique properties and their similarity to certain biological systems (e.g. E. Tsuchida, K. Abe, Advances in Polymer Science, Vol. 45, 1982). In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing. These high-charge density complexes are not readily formed in organic solvents due to the insolubility of the individual components. Therefore, little work has detailed the solution properties of these systems. Few studies have focused on the viscosification aspects of high or low-charge density complexes in organic diluents. In these studies, viscosity is used only as a tool to study the development and mechanism of complex formation.

Interpolymer acid-base complexes of the carboxyl and amine type are taught in U.S. Pat. No. 4,002,436. However, the polymers used therein are generally limited to polymers of the free radical addition type.

There are many applications for thickened or gelled solutions of polymers in organic liquids which are quite diverse. There are also a number of physical and chemical techniques for preparing such systems. The present invention is concerned with a process for creating a liquid which increases in viscosity with increasing shear rate. The potential applications for this process and the products derived therefrom will be evident in the instant invention. Some of these applications are as a viscosifier and shear thickening additive for organic liquids or solutions, or for gelling an organic liquid.

Shear thickening fluids are rare and have mostly been demonstrated in suspensions (W. H. Bauer and E. A. Collins in "Rheology", Vol. 4, edited by F. R. Eirich, page 459, Academic Press, 1967). Polymer solutions and melts are known, on the other hand, to exhibit strong shear thinning behavior while most liquids of lower molecular weight are Newtonian.

A polymer which was introduced by ICI (FM-9) as an antimisting agent for jet fuel was shown to be "progressively shear thickening." Work done by S. T. J. Peng and R. F. Landel, J. Appl. Phys. 52, 5988.(1981), at Jet Propulsion Laboratories under an FAA contract for antimisting in jet fuels showed that subjecting a solution of FM-9 in jet fuel at about 0.3 to 1.0 weight percent polymer to steady shearing will produce viscous growth with time. It was found that the time scale and the extent of thickening can be accelerated by either increasing the concentration or by increasing the shear rate. The composition of FM-9 is not disclosed by ICI or by other agents working with this polymer. Peng and Landel correlate antimisting behavior with shear thickening or with high elongational viscosity in "Rheology", Vol. 2, edited by G. Astarita, page 385, Plenum Press, 1980.

This invention teaches the enhancement of the viscosity of hydrocarbon solutions with shear rate by preparing polymers which are capable of building large networks. A way for achieving such networks is the complexation of two dissolved polymers, one having low levels of carboxylic acid groups along its backbone and the other having low levels of basic groups along its backbone. The complex can be achieved by dissolving each polymer alone in the solvent and combining the two solutions. Alternately, each polymer can be codissolved in the same solution system. When polymer molecules of opposite acidity and basicity meet in solution, a neutralization reaction occurs forming a complex of positively and negatively charged species.

In order to avoid phase separation of the complex in solution, the charge density along the polymer backbones should be relatively low. The resulting solution of such a complex is then significantly more viscous than solutions containing the individual polymers, provided that the total numbers of negative and positive charges are correctly balanced. Upon addition of a strongly polar agent such as an alcohol, the complex can be disturbed and the viscosity reduced.

This invention further teaches that, for a given balance of the various parameters that may be varied in an interpolymer complex solution, an unexpected shear thickening behavior (Dilatant or Rheopectic Behavior) may be obtained. These parameters include:

Backbone nature of each of the polymers (or copolymers).

The functionality densities along the polymer backbones.

The molecular weight of each polymer.

The ratio between the polymers introduced into solution.

The solvent (and cosolvent, if any).

The concentration of polymer in solution.

We report the finding that low-charge density interpolymer complexes (styrene-co-4-vinyl pyridine: copolymer of an alpha-olefin and a vinyl alkylene carboxylic acid) are useful in viscosifying relatively nonpolar solutions (as required in a variety of well control and work-over fluids, various pharmaceutical applications, oil additives and a host of other systems containing a hydrocarbon-based solvent). These complexes are soluble in a nonpolar solution, but more importantly, possess a substantially higher viscosity than the corresponding individual low-charge density copolymer components. As detailed earlier, these results are unexpected since the general tendency of interpolymer complexes is to be rather insoluble in this environment. As a result these latter materials, prior to the findings of this specification, have poor viscosification properties and thickening efficiency.

Most solutions of high molecular weight polymers are expected to exhibit a shear thinning behavior. This is due to the destruction of an entangled network or a reduced interference between the polymer molecules after orientation at high shear rates. We find that these soluble interpolymer complexes, under narrow conditions, seem on the other hand to possess an ability to establish even larger networks or act as if networks are larger under high shear rates. Insome cases, interpolymer complexes may show a conventional shear thinning behavior, in other cases they may be shear thickening with a relatively quick response to shear rate change (dilatant behaviour), or they may be "progressively shear thickening" with time under shear (rheopectic or anti-thixotropic behavior).

SUMMARY OF THE INVENTION

The present invention relates to a process for the improved viscosification of an organic hydrocarbon liquid having a viscosity typically, but not necessarily less than about 10 cps. at 100° F. which includes the steps of forming a first solution of a polymer containing carboxylic acid groups in the organic hydrocarbon liquid wherein the copolymer is a hydrolyzed Ziegler-Natta ester containing copolymer of an alpha-olefin and a vinyl alkylene-carboxylic acid; forming a second solution of a basic polymer in the organic hydrocarbon liquid and mixing the first and second solutions to form a solution of the organic hydrocarbon liquid and an interpolymer complex of the two polymers, wherein the resultant solution of the organic hydrocarbon liquid has a viscosity of at least about 10 cps at 100° F. and furthermore exhibits a further increase in viscosity as shear rate increases.

Accordingly, it is a primary object of the instant invention to describe an economical process for forming a highly viscous organic hydrocarbon solution containing a soluble interpolymer complex having a viscosity greater than the mean of the two individual polymer components.

A further object of the instant invention is to provide a process for forming a homogeneous solution which can be used as a viscosifier for hydrocarbon systems, said fluid displaying shear thickening behavior.

A still further object of the instant invention is to provide a process for reversing visosification and shear thickening of said hydrocarbon solutions.

GENERAL DESCRIPTION

The present invention relates to an improved process for the improved viscosification of an organic hydrocarbon liquid having a viscosity typically, but not necessarily less than about 10 cps. which includes the steps of forming a first solution of a polymer containing carboxylic acid groups in the organic hydrocarbon liquid; forming a second solution of a cationic polymer in the organic hydrocarbon liquid and mixing the first and second solutions to form a solution of the organic hydrocarbon liquid and an interpolymer complex of the two polymers, wherein the resultant solution of the organic hydrocarbon liquid has a viscosity of at least about 10 cps, and furthermore exhibits shear thickening behavior. The component materials of the instant process generally include a water insoluble interpolymer complex dissolved in an organic hydrocarbon solvent system to form a solution, wherein the concentration level of the interpolymer complex in the solution is about 0.01 to about 10 weight percent.

A second aspect of the instant invention relates to the fact that the interpolymer complexes are more effective thickeners than the two individual component polymers.

A third aspect of the instant invention relates to the use of these interpolymer complexes in nonpolar hydrocarbon solvents as a shear thickening agent under increased shear conditions.

A fourth aspect of the instant invention relates to the observation that the thickening aspects of these interpolymer complexes can be markedly reduced or completely eliminated with the use of a suitable low molecular weight polar cosolvent.

In general, the interpolymer complex is formed from the interaction in solution of a water insoluble polymer containing carboxylic acid groups (polymer A) and a basic copolymer such as styrene/vinyl pryidine copolymer (polymer B).

The carboxylic acid containing polymer of the instant invention is a copolymer containing an alpha-olefin and a vinyl alkylenecarboxylic acid having about 4 to about 20 carbon atoms, more preferably about 9 to about 18 and most preferably about 10 to about 16, wherein the resulting alkylenecarboxylic acid side groups are randomly distributed along the alpha-olefin backbone. The alpha-olefin has about 3 to about 27 carbon atoms, more preferably about 6 to about 25, and most preferably about 6 to about 18. The copolymer contains about 0.01 to about 5 mole % of the alkylenecarboxylic acid side groups more preferably about 0.05 to about 3 and most preferably about 0.1 to about 2. The number average molecular weight as measured by GPC of the alpha-olefin copolymer is about 100,000 to about 20,000,000, more preferably about 100,000 to about 15,000,000, and most preferably about 100,000 to about 10,000,000. The copolymer of the alpha-olefin and vinyl alkylenecarboxylic acid is formed by first hydrolyzing the organic ester with a base and then subsequently optionally treating with concentrated sulfuric acid or other suitable acids having a sufficiently low pH to effect hydrolysis, wherein the hydrolysis occurs in a solvent which is inert itself to hydrolysis such as an aliphatic or aromatic hydrocarbon. The substantially complete hydrolysis of the copolymer of an alpha-olefin and a vinyl alkylene ester and optional acid treatment is represented by the reaction scheme:

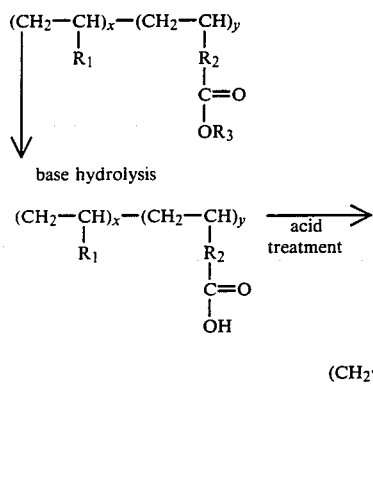

base hydrolysis (CH$_2$—CH)$_x$—(CH$_2$—CH)$_y$
R$_1$    R$_2$
         C=O
         OH acid treatment →

(CH$_2$—CH)$_x$—(CH$_2$—CH)$_y$
R$_1$    R$_2$
         C=O
         OZ wherein Z is a mixture of H and alkyl groups having about 1 to about 25 carbon atoms, wherein H comprises about 55 to about 99 mole % of Z, more preferably about 5 to about 95 mole%, and most preferably about 70 to about 90 mole%. R$_1$ is an alkyl group having about 1 to about 25 carbon atoms, R$_2$ is an alkylene group having about 3 to about 17 carbon atoms R$_3$ is an alkyl group having about 1 to about 25 carbon atoms, x is about 99.99 to about 95.0 mole %, more preferably about 99.95 to about 97.0 and most preferably about 99.90 to about 98.0. Suitable bases used in the first hydrolysis step of the ester are selected from the group consisting of t-BuO$^-$, nBuO$^-$, OH$^-$, EtO$^-$ and PrO$^-$. Suitable acids used in the second hydrolysis step are selected from the group consisting of H$_2$SO$_4$, HCl, H$_3$PO$_4$, toluene sulfonic acid, and HNO$_3$.

It is evident that the copolymers covered within this invention encompass a broad class of hydrocarbon polymer systems. It is important that these hydrocarbon polymer backbones (in the absence of the acid groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook edited by Brandrup and Immergut, Interscience Publishers, 1967, section VI-341). In the absence of appropriate polymer-solvent compatibility knowledge, this can be determined experimentally by observing whether the selected polymer will be soluble in the solvent at a level of ½ gram of polymer per 100 ml solvent. If the polymer is soluble, then this demonstrates that it is an appropriate backbone for modification with acid groups to achieve the objectives of this invention. It is also apparent that polymers which are too polar will not be soluble in the relatively nonpolar organic liquids of this invention. Therefore, only those polymer backbones (i.e., as measured in the absence of polar groups) having a solubility parameter less than 10.5 are suitable in this invention.

The basic nitrogen-containing copolymer such as styrene-vinyl pyridine copolymer (polymer B of the interacting polymer complex) can be formed by free radical copolymerization using techniques well-known in the polymer literature. Such polymers can be prepared by polymerizing by a variety of techniques a basic nitrogen-containing monomer such as vinyl pyridine with styrene, t-butyl styrene, alkyl acrylates, alkyl methacrylates, butadiene, isoprene vinyl chloride, acrylonitrile, butadiene/styrene monomer mixtures and copolymers, or more complex mixtures. An emulsion polymerization process is generally preferred, but other processes are also acceptable.

The amount of vinyl pyridine in the aminecontaining polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred The water insoluble base nitrogen-containing copolymer will comprise from about 0.5 to 50 weight percent basic groups situated along the chain backbone, or alternatively the basic groups content will range from 4 milliequivalents to about 500 milliequivalents per 100 g of polymer. The basic groups may be conveniently selected from the groups containing polymerizable primary, secondary and tertiary amine groups. Included in these categories are pyridine, anilines, pyrroles, and other basic polymerizable ammonia derivatives. Specific polymers include styrene-4-vinylpyridine, t-butyl styrene-4-vinylpyridine, ethylene-4-vinylpyridine copolymers, propylene-4-vinylpyridine copolymers, acrylonitrile-4-vinylpyridine, methyl methacrylate-4-vinylpyridine copolymers, block copolymers and ethylene oxide/4-vinylpyridine, acrylic acid-4-vinylpyridine copolymers, ethylene-propylene 4-vinylpyridine terpolymers, isoprene-4-vinylpyridine, 4-vinylpyridine-elastomers copolymers and the like. The preferred base-containing polymers of the instant invention are styrene and 4-vinylpyridine and ethylene-propylene terpolymers with grafted 4-vinylpyridine. The former polymers are the preferred species.

These materials are prepared through conventional solution, suspension and emulsion copolymerization techniques.

The copolymer of styrene/vinyl pyridine is typically formed by the emulsion copolymerization of freshly distilled styrene and N-vinylpyridine monomers. This method of copolymerization is generally known to those well-versed in the art. As noted previously, solution or suspension techniques may also be used to prepare those base-containing polymeric materials.

The interpolymer complex of the copolymer of the alpha-olefin and the alkylene carboxylic acid and the copolymer of styrene/vinyl pyridine is formed by forming a first solution of the copolymer of the alpha-olefin and alkylene carboxylic acid in the previously described solvent system. A second solution of the copolymer of styrene/vinyl pyridine is formed by dissolving the copolymer of styrene/vinyl pyridine in an aromatic solvent such as xylene or benzene. Alternatively, both polymers can be dissolved simultaneously in the same solvent. The concentration of the copolymer of the alpha-olefin and alkylenecarboxylic acid in the solution is about 0.001 to about 5 g/dl, more preferably about 0.01 to about 4, and most preferably about 0.01 to about 1.5. The concentration of the copolymer of styrene/vinyl pyridine in the second solution is about 0.001 to about 5 g/dl, more preferably about 0.01 to about 4, and most preferably about 0.01 to about 1.5. The first solution of the copolymer of the alpha-olefin and alkylenecarboxylic acid and the second solution of the copolymer of styrene/vinyl pyridine are mixed together, thereby permitting the interaction of the copolymer of the alpha-olefin and alkylenecarboxylic acid and the copolymer of styrene/vinyl pyridine to form the water insoluble interpolymer complex. The molar ratio of the copolymer of the alpha-olefin alkylene carboxylic acid to the copolymer of styrene/vinyl pyridine in the interpolymer complex is about 0.1 to about 20, more preferably about 0.5 to about 10, and most preferably about 1 to about 5. The concentration of the interpolymer complex in the hydrocarbon organic liquid is about 0.01 to about 10 weight percent, more preferably about 0.1 to about 7, and most preferably about 1.0 to about 5.

The organic liquids, which may be utilized in the instant invention, are selected with relation to the ionic polymer and vice-versa. The organic liquid is selected from the group consisting of aromatic hydrocarbons, cyclic aliphatic ethers, aliphatic ethers, or organic aliphatic esters and mixtures thereof.

Specific examples of organic liquids to be employed with the various types of polymers are: benzene, toluene, ethyl benzene, methylethyl ketone, xylene, styrene, ethylenedichloride, methylene chloride, styrene, t-butyl styrene, aliphatic oils, aromatic oils, hexane, heptane, decane, nonane, pentane, aliphatic and aromatic solvents, oils such as Solvent "100 Neutral," "150 Neutral" and similar oils, diesel oil, octane, isooctane, aromatic solvents, ketone solvents, dioxane, halogenated aliphatics, e.g., methylene chloride, tetrahydrofuran.

The viscosity of organic hydrocarbon solution of the interpolymer complex having an increased viscosity can be reduced by the addition of a polar cosolvent. A polar cosolvent added to in the mixture of organic liquid and water insoluble interpolymer complex solubilizes the pendant carboxylic acid groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, interpolymer complex and polar cosolvent.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The polymeric complexes of the instant invention show improved viscosification in the organic hydrocarbon liquid as compared to the polymeric complexes of U.S. Pat. No. 566,349, filed Dec. 28, 1983 because the extent of hydrolysis of ester groups to carboxylic acid groups is more easily controlled and higher levels of carboxylic acid can be obtained.

DETAILED DESCRIPTION OF THE PREFERRED EMBODIMENT

The following examples will demonstrate the performance of an interpolymer complex consisting of a polymer containing carboxylic acid side groups and a styrene-4-vinylpyridine in several specific nonpolar hydrocarbon solvent environments.

EXAMPLE 1

Synthesis Of Polymers A1 and A2 Having Alkylenecarboxylic Acid Side Chains (a) Copolymerization of 1-Octene and methyl-10-undecenoate A 2-liter flask was charged with a mixture of n-heptane (480 ml), 1-octene (500 ml), methyl-10-undecenoate (6.4 g), and diethyl aluminum chloride (72 m mole), and heated to 60° C.

The catalyst containing $TiCl_3$ (described in U.S. Pat. No. 4,240,928) (2.0 g) was then added with n-heptane (20 ml). After stirring for 1 hour, the reaction was terminated with a small amount of isopropyl alcohol.

The polymer was precipitated and washed with isopropyl alcohol and vacuum dried at 60° C. to yield 87.9 g of colorless material. IR spectrum showed that the copolymer contained 0.8 mole % of methyl-10-undecenoate unit. Intrinsic viscosity was about 4.3 dl/g in a decalin solution. Mn was $4.6 \times 10^6$ by means of GPC.

(b) Base Hydrolysis—Polymer A1

A flask was charged with a solution of 1-octene-methyl-10-undecanoate copolymer similar to the one described in (a) above (4.0 g) in 200 g THF and 0.82 g t-BuOK. The solution was heated to 50°–60° C. After one hour, another 150 ml THF was added and 3.6 ml of 2N $H_2SO_4$ was added to neutralize the solution (ph=5). After cooling, the polymer was precipitated in 600 ml of water/iospranol (1:1 vol/vol.). The polymer was filter washed with water and isopranol and dried to yield 4.0 g of product which had about 100% of the original ester groups hydrolyzed to carboxyl groups by IR. The viscosity of this polymer in xylene (2%) was 19 cP at $30s^{-1}$.

(c) Acid Treatment—Polymer A2

2.0 g of the polymer prepared according to Example 1(b) was dissolved in 100 g xylene. A 3 ml quantity of concentrated $H_2SO_4$ was added at room temperature. The batch was stirred for 1 hour at room temperature and subsequently precipitated in isopranol/water and dried under vacuum while heating. The polymer showed an enhanced viscosity of 34 cP at $30s^{-1}$ at 2% concentration in xylene which is higher than the solution viscosity shown in (b) above.

EXAMPLE 2

Synthesis of Styrene-Vinylpyridine Copolymer—Polymer B

A representative example for the synthesis of styrene-4-vinylpyridine copolymer (SVP) is outlined below.

Into a 1-liter 4-neck flask the following ingredients were introduced:

100 g distilled styrene
6.4 g sodium lauryl sulfate
240 ml. distilled water
0.4 g potassium persulfate
9.4 g 4-vinylpyridine The solution was purged with nitrogen for 10 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis showed a nitrogen content of 1.13 weight percent which corresponds to 8.4 mole percent 4-vinylpyridine.

EXAMPLE 3

Viscosification by Network Formation

Polymers A1 and A2 of Example 1 having acid functionalities and polymer B of Example 2 having base functionalities were separately dissolved in xylene at 0.5 weight percent concentration. Various mixtures of these two solutions were prepared in order to form polymer networks in solution via acid-base interactions.

The resulting solution viscosities at 25° C. and 30 $sec^{-1}$ are shown in Table 1.

TABLE 1

VISCOSITIES OF ACID-BASE NETWORK SOLUTIONS IN XYLENE AT 0.5 WEIGHT PERCENT POLYMER (TOTAL)

| Composition Parts A1 or A2/Parts B | Viscosity (cP)* | |
|---|---|---|
| | A1/B | A2/B |
| 100/0 | 2.1 | 2.2 |
| 95/5 | 2.0 | 92 |
| 90/10 | — | 140 |
| 85/15 | — | 38 |
| 50/50 | — | 10 |
| 0/100 | 2.6 | 2.6 |

*at 25° C. and 30 $sec^{-1}$

This example shows that a copolymer containing carboxylic acid groups which was base hydrolyzed (Polymer A1) may not interact well with a base containing Polymer (B), but a strong interpolymer formation is made possible by acid treating a base hydrolyzed copolymer (A2). Acid treating is a single procedure as shown in Example 1(c) and it enables control over the degree of hydrolysis or ability to form a network with a basic polymer.

EXAMPLE 4

Shear Thickening

The polymer complex solution shown in Example 3 as composition 90/10 of polymer A2/polymer B was studied with respect to its viscosity vs. shear rate at 25° C. in a Haake CV-100 viscometer. This solution at a total polymer concentration of 0.5 weight percent showed dilatant (shear thickening) behavior:

| Shear Rate ($sec^{-1}$) | Viscosity (cP) |
|---|---|
| 3 | 85 |
| 9 | 90 |
| 21 | 108 |
| 30 | 140 |
| 70 | 158 |

Shear thickening behavior is a useful property for applications such as antimisting. Shear thickening is displayed in this example for an interpolymer network solution where the polymer containing carboxylic acid groups was prepared via base hydrolysis followed by acid treatment (polymer A2 of Example 1). Solutions of polymer A1 (which is the precursor of polymer A2 before acid treatment) or the mixtures of polymer A1 and polymer B in xylene at 0.5 weight percent did not exhibit shear thickening behavior.

This example demonstrates the importance of acid treating of a base hydrolyzed copolymer when shear thickening solutions are required.

What is claimed is:

1. A process for increasing the viscosity of a hydrocarbon liquid having a viscosity of at least about 10 cP which includes the steps of:

(a) forming a first solution of an organic hydrocarbon liquid and a hydrolyzed ester containing copolymer of an alpha-olefin and a vinyl alkylenecarboxylic acid copolymerized with a Ziegler-Natta catalyst having an acid content of from about 0.01 to 10 mole percent and a molecular weight of about 100,000 to about 10,000,000, wherein said copolymer of said alpha-olefin and said vinyl alkylenecarboxylic acid has the formula:

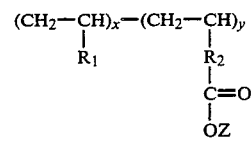

wherein Z is a mixture of H and an alkyl group having about 1 to about 25 carbon atoms, wherein H comprises about 55 to about 99 mole% of Z, $R_1$ is an alkyl group having about 1 to about 25 carbon atoms, $R_2$ is an alkylene group having about 1 to about 17 carbon atoms, x is about 99.99 to about 95.0 mole %; and (b) forming a second solution of an organic hydrocarbon liquid and an amine containing polymer which contains basic nitrogen atoms wherein the basic nitrogen content ranges from about 4 to about 500 milliequivalents per 100 gms. of polymer;

(c) mixing said first and said second solutions to form a hydrocarbon solution liquid having an interpolymer complex of said neutralized copolymer of an alpha-olefin and a vinyl alkylenecarboxylic acid and said amine containing polymer therein, wherein said complex is present at a level of from 0.01% to about 10%; and (d) subjecting said hydrocarbon solution of said interpolymer complex to an increasing shear rate thereby causing the viscosity of said hydrocarbon solution to said interpolymer complex to increase.

2. A process according to claim 1 wherein said organic liquid is selected from the group consisting of aromatic hydrocarbons, ketones, chlorinated aliphatic hydrocarbons, aliphatic hydrocarbons, cyclic aliphatic ethers, aliphatic ethers or organic aliphatic esters and mixtures thereof.

3. A process according to claim 1 wherein said organic liquid is selected from the group consisting of aliphatic hydrocarbons or aromatic hydrocarbons.

4. A process according to claim 1 wherein said organic liquid is selected from the group consisting of benzene, toluene, ethyl benzene, xylene, or styrene and mixtures thereof.

5. A process according to claim 1 wherein said basic polymer is a copolymer of styrene/vinyl pyridine.

6. A process according to claim 1 or 5 wherein said styrene-4 vinylpyridine copolymer has about 0.1 to 50 mole percent 4 vinylpyridine units.

7. A process according to claim 1, wherein said base-containing polymer is selected from the group containing primary, secondary and tertiary amine units.

8. A process according to claim 1 wherein said interpolymer complex possesses shear thickening characteristics.

9. A process according to claim 1, wherein said interpolymer complex thickening characteristics are modulated or totally eliminated by a polar cosolvent.

10. A process according to claim 9 wherein said polar cosolvent has a greater polarity than said organic liquid.

11. A process according to claim 9 wherein said polar cosolvent is selected from the group consisting of aliphatic alcohols, aliphatic amines, di- or tri-functional aliphatic alcohols, water miscible amide, acetamides, phosphates, or lactones and mixtures thereof.

12. A process according to claim 9 wherein said polar cosolvent is selected from the group consisting of methanol, ethanol, propanol, isopropanol and mixtures thereof.

13. A process according to claim 9 wherein said polar cosolvent has a solubility parameter of at least about 10 and is water miscible.

14. A process according to claim 1 wherein said polymers are codissolved in said organic hydrocarbon liquod.

15. A solution which comprises:
(a) an organic liquid; and
(b) about 0.01 to about 10 weight percent of an interpolymer complex of:
  (1) a copolymer of styrene/vinyl pyridine; and
  (2) a hydrolyzed ester copolymer of an alpha-olefin and a vinyl alkylene carboxylic acid copolymerized with a Ziegler Natta catalyst having the formula:

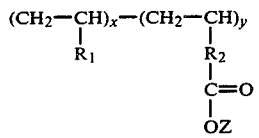

wherein Z is a mixture of H and an alkyl group having about 1 to about 25 carbon atoms, wherein H comprises about 55 to about 99 mole% of Z, $R_1$ is an alkyl group having about 1 to about 25 carbon atoms, $R_2$ is an alkylene group having about 3 to about 17 carbon atoms, and x is about 99.99 to about 95.0 mole%, said copolymer having a molecular weight of about 100,000 to 10,000,000.

* * * * *